Feb. 10, 1970  T. Z. HERR  3,494,074
SHOCK ABSORBING UNIT FOR A SLIDING FLUSH DOOR
Filed Feb. 7, 1968  2 Sheets-Sheet 1
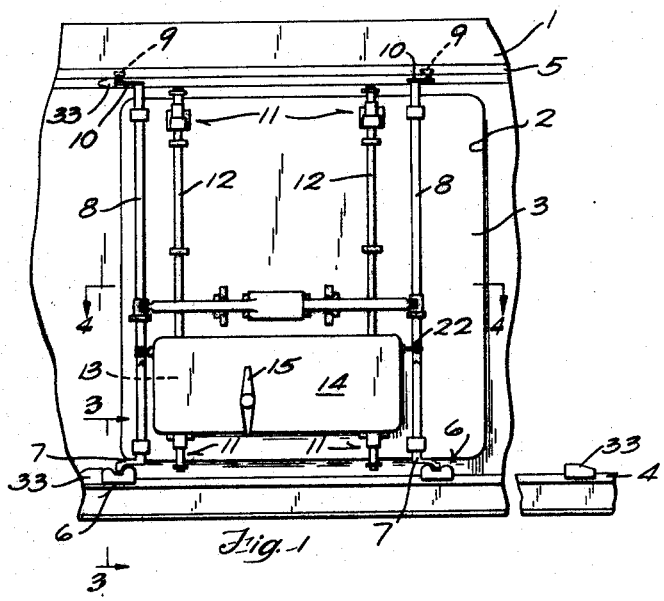
Inventor
Theodore Z. Herr
By Andrus & Starke
Attorneys Feb. 10, 1970 T. Z. HERR 3,494,074
SHOCK ABSORBING UNIT FOR A SLIDING FLUSH DOOR
Filed Feb. 7, 1968 2 Sheets-Sheet 2
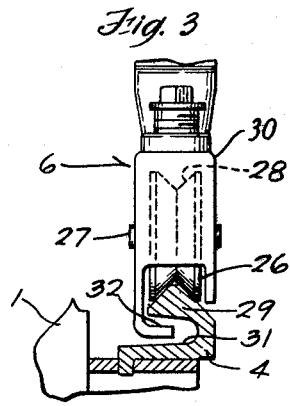
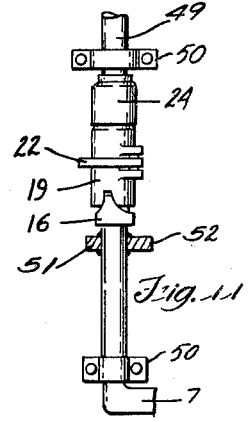
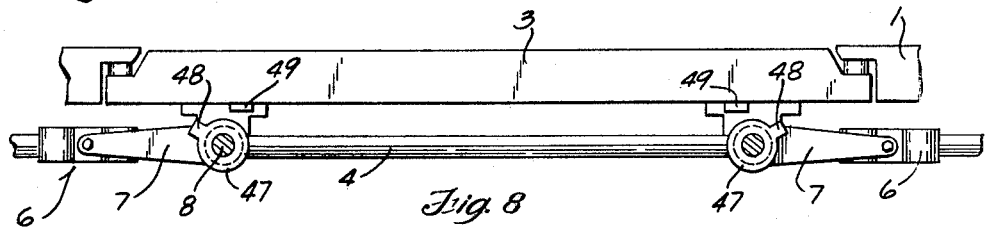
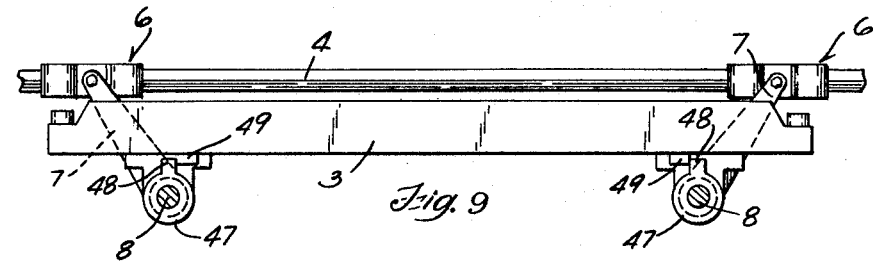
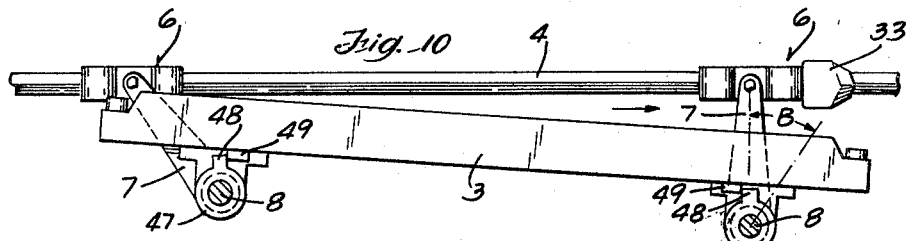
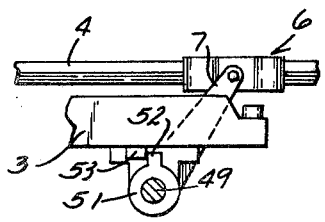
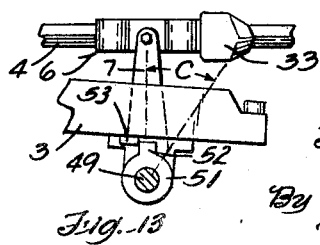
Inventor
Theodore Z. Herr
By Andrus & Starke
Attorneys United States Patent Office 3,494,074
Patented Feb. 10, 1970

3,494,074
SHOCK ABSORBING UNIT FOR A SLIDING
FLUSH DOOR
Theodore Z. Herr, 672 Hyacinth Place,
Highland Park, Ill. 60035
Filed Feb. 7, 1968, Ser. No. 703,655
Int. Cl. E05d *15/10;* E05f *5/02*
U.S. Cl. 49—220                    13 Claims

ABSTRACT OF THE DISCLOSURE

A shock absorbing unit associated with a sliding flush door for a railway car. The upper and lower ends of the door are pivotally connected to crank arms which carry rollers that ride in tracks mounted on the car. The crank arms at the upper and lower ends of the door are connected together by connecting rods which are rotated by an operating mechanism to pivot the crank arms and move the door laterally in and out of the opening.

A shock absorbing unit is associated with the connecting rods and includes a resilient member. A predetermined degree of rotation of the connecting rods, beyond that normally required to pivot the crank arms and move the door between the open and closed positions, will act to deform the resilient member and absorb the impact imparted through the crank arms when the open door strikes the door stop.

---

The invention relates to a shock absorbing unit associated with a sliding flush door for a railway car. Openings in the sides of a box car or refrigerator car are normally enclosed by sliding flush doors which slide in tracks mounted on the sides of the car above and below the door opening. After being moved to a position in alignment with the opening, the door is moved laterally into the opening so that the inner surface of the car is generally flush with the inner surface of the door. The door is then locked in this position. To provide both sliding and lateral movement for the door, the upper and lower ends of the door are pivotally connected to crank arms which carry rollers that ride in the tracks mounted in the car. The crank arms at the upper and lower ends of the door are mounted in vertical alignment and are connected by vertical connecting rods to an operating mechanism located on the outside of the door. By rotating the connecting rods through the operating mechanism, the crank arms are pivoted to move the door laterally into or out of the opening in the car wall.

When the door is in the open position, it is freely slidable along the tracks. It has been the practice in the past to install front and back stops on the side of the railway car to prevent the open door from leaving the tracks if the car is accidentally impacted. In some cases railway cars are designed with a width slightly less than the maximum width requirements, but even in these cases the door stop cannot extend outwardly from the car far enough to provide an effective overlap with the door, so that even at impact speeds of 2 to 3 miles an hour, the door will tend to climb the stops and must usually be disengaged with tools.

In other types of railway cars the car width approximates the maximum width requirements and there is no clearance for side car stops, with the result that the doors can jump the track and can be damaged even at extremely low impact speeds.

The present invention is directed to a shock absorbing unit to be associated with a sliding flush door for a railway car which effectively dissipates the energy of impact of the moving door and yet does not increase the overall width or profile of the railway car. In one form of the invention, a resilient block is positioned on the outside of the door and a pair of arms are connected to opposite surfaces of the block. Each arm is connected by a crank to a vertical connecting rod which is also operably connected to the crank arms which carry the door. The arms are connected to the cranks by a lost motion connection so that normal rotation of the connecting rods to pivot the crank arms and move the door in and out of the door opening will not move the arms relative to the resilient block. However, when the open door hits the door stop under impact, the crank arms will pivot beyond their normal limits and this pivotal movement is transmitted through the vertical connecting rods to the arms which thereby stretch the resilient block and the stretching of the block acts to dampen or dissipate the energy of impact.

The shock absorbing unit of the invention is preferably utilized in conjunction with a slip-clutch mechanism, such as that disclosed in the copending application of the same inventor, Ser. No. 616,221, filed Feb. 15, 1967, now Patent No. 3,386,205 and entitled Door Operating and Locking Mechanism, which acts to prevent excessive torque due to impact from being transmitted from the connecting rods to the door operating and locking mechanism.

In a modified form of the invention, a tube is positioned around the vertical connecting rod and a resilient sleeve is located between the rod and the tube and is bonded to the members. When the rod is subjected to above-normal torque due to impact, the resilient sleeve is twisted or stretched to absorb the force of impact.

The shock absorbing unit of the invention acts to absorb the energy of impact in either direction of door movement, and the door will automatically return to its normal open position after the impact.

Furthermore, the shock absorbing unit not only effectively absorbs impact, but replaces four car-side stops which are normally associated with the conventional railway car.

The shock absorbing mechanism of the invention is located on the outside of the door, but within the profile of the door operating and locking mechanism, and thus the shock absorbing unit does not project beyond the wall of the car when the door is closed, thereby keeping the car within the maximum width requirements.

The shock absorbing unit can be applied to a wide variety of cars and adequate shock absorption is obtained without compromise due to varying car widths.

As the shock absorbing unit is attached to the door and not to the car itself, no holes or attachments need be applied to the side wall of the railway car.

Other objects and advantages will appear in the course of the following description.

The drawings illustrate the best mode presently contemplated of carrying out the invention.

In the drawings:

FIGURE 1 is a fragmentary side elevation of a railway car showing the shock absorbing unit of the invention as associated with the sliding flush door;

FIG. 2 is an enlarged fragmentary side elevation showing the shock absorbing unit of FIG. 1;

FIG. 3 is a section taken along line 3—3 of FIG. 1 showing the mounting of the roller unit on the lower guide track;

FIG. 4 is a section taken along line 4—4 of FIG. 1 showing the shock absorbing unit with the door in the closed position;

FIG. 5 is a view similar to FIG. 4 showing the shock absorbing unit with the door in the open position;

FIG. 6 is a view similar to FIG. 4 showing the shock absorbing unit with the door in the impacted position;

FIG. 7 is a modified form of the invention showing the shock absorbing unit as associated with the vertical operating rod;

FIG. 8 is a diagrammatic view showing the shock absorbing unit of FIG. 7 with the door in the closed position;

FIG. 9 is a view similar to FIG. 8 showing the shock absorbing unit of FIG. 7 with the door in the open position;

FIG. 10 is a view similar to FIG. 8 showing the shock absorbing unit of FIG. 7 with the door in the impacted position;

FIG. 11 is a second modified form of the invention utilizing a torsion rod as the shock absorbing mechanism;

FIG. 12 is a diagrammatic view showing the shock absorbing unit of FIG. 11 with the door in the open position; and FIG. 13 is a view similar to FIG. 12 showing the shock absorbing unit of FIG. 11 with the door in the impacted position.

The drawings illustrate a railway car 1, such as a box car, refrigerator car or grain car, having an opening 2 in the side wall which is adapted to be enclosed by a sliding flush door 3. The door 3 is of conventional construction and is normally formed of outer and inner faces which may be separated by a lightweight insulating core. When in the closed position, the door is adapted to bear against a seal or gasket mounted on the door frame to provide a tight sealing engagement. The door construction can be similar to that described in the copending application of the same inventor, Ser. No. 616,221, filed Feb. 15, 1967, and entitled "Door Operating and Locking Mechanism."

The door 3 is mounted for sliding movement along the side wall of the car 1 on a lower guide rail 4 which is secured to the side wall of the car below the opening 2, and on an upper guide track 5 mounted on the side wall of the car above the opening 2. As shown in FIG. 1, a pair of roller units 6 are mounted for movement on the lower rail 4 and each roller unit is carried by one end of a crank arm 7, while the other end of each crank arm is connected to a vertical operating rod 8. To guide the upper end of door 3 in sliding movement along the upper track 5, rollers 9 engage the flange of the track 5, and each roller is connected to one end of a crank arm 10. The crank arms 10 are secured to the upper ends of the vertical operating rods 8. By rotating the rods 8, the corresponding crank arms 7 and 10 will be pivoted around the axes of the rods 8 to thereby move the door 3 laterally in and out of the opening 2.

To lock the door in the closed position, a series of locking units, indicated generally by 11, are connected to vertical rods 12 and an operating mechanism 13 is located within the cover 14 attached to the outer surface of the door. The operating mechanism 13 is operably connected to both the rods 8 and the rods 12 and is actuated by rotating a handle 15. Rotation of the handle 15 acts through the operating mechanism 13 to rotate the rods 8 to move the door laterally with respect to the opening and also to move the rods 12 vertically to move the locking members 11 in and out of locking engagement. The operating mechanism itself forms no part of the present invention and can be similar to that described in the aforementioned patent application, Ser. No. 616,221, filed Feb. 15, 1967.

The rods 8 are connected to the operating mechanism 13 through a slip-clutch or overload protection unit which prevents excessive torque from being applied to the crank arms 7 and 10 after the door is in the closed position, or conversely, prevents excessive torque from being applied through the rods 8 to the operating mechanism in the event the door, when in the open position, is subjected to impact.

The slip-clutch unit, as best shown in FIG. 2, includes a collar 16 which is secured to the rod 8 and each collar is provided with a pair of opposed, upwardly extending projections 17 having inclined surfaces 18. A sleeve 19 is journalled around the rod by suitable bearings, and sleeve 19 is provided with a pair of recesses 20 having inclined surfaces 21 which engage and complement the inclined surfaces 18 on collar 16. Crank arm 22 is connected to the sleeve 19 by a pin, and linear movement of the arm 22 serves to rotate the sleeve 19.

To urge the inclined surfaces 21 downwardly against the corresponding inclined surfaces 18, a coil spring 23 is located within a housing 24 and the lower end of the spring bears against the sleeve 19 while the upper end of the spring bears against a collar 25 fixed to the rod 8.

When the sleeve 19 is rotated by the crank arm 22, the rod 8 will be rotated through the connection of the inclined surfaces 18 and 21 to pivot the crank arms 7 and 10 and move the door laterally into or out of the door opening. However, the driving connection of the inclined surfaces will slip or disengage to prevent overloading of the rods 8 by the operating mechanism 13. Moreover, if the door is subjected to an impact force when in the open position, the impact will not be transmitted back through to the operating mechanism 13 due to the slip-clutch or overload protection unit.

Each of the roller units 6 which ride on the rail 4 includes a pair of rollers 26 mounted on shafts 27. As shown in FIG. 3, rollers 26 are provided with peripheral grooves 28 which receive the V-shaped upper edge 29 of the track 4. The rollers of each roller unit 6 are housed within a housing 30 and the shafts 27 are journalled in the opposed side walls of the housing.

To prevent displacement of the roller unit 6 from the rail 4, the rail is provided with a longitudinally extending groove or recess 31 and a bent lip or flange 32 on the inner wall of the housing 30 is located within the groove. The cooperation of the lip 32 with the groove 31 prevents the roller units 6 from jumping the rail 4.

According to the invention, a shock absorbing unit is associated with the rods 8 and serves to absorb the shock resulting from the roller units 6 striking the stops 33 which are located at the ends of the guide rails 4 and 5. As the door 3 is freely movable along the rail 4 and the track 5 when the door is in the open position, stops, such as those indicated by 33, are normally located at the ends of the rail to prevent the door from jumping the rail. When the railway car is subjected to an impact during switching or coupling, the door 3, if open, will roll along the rails 4 and strike the stops 33. The present invention provides a shock absorbing unit which will absorb, without damage, the energy of impact resulting from the door striking the stops 33.

The shock absorbing unit includes a pair of cranks 34 which are secured to the rods 8 above the slip clutch assemblies. Each crank 34 is pivotally connected to the outer end of an arm 35 by a pin 36 which extends through an elongated slot 37 in the arm 35. The inner ends of the arms 35 are bonded to opposite surfaces of a resilient shear block 38 made of rubber or other elastic material. As the arms 35 are moved outwardly, or away from each other, the block 38 will be put into shear or stretched to provide a damping action.

The arms 35 are guided in horizontal movement on the outer face of the door 3 by a pair of forked brackets 39 and 40 which extend outwardly from the door 3. In addition, a pair of stops 41 and 42 are secured to the inner surface of the arm 35a and are adapted to engage the fork bracket 39 and limit the horizontal movement of the arm 35a. Similarly, a pair of stops 43 and 44 are mounted on the other arm 35b and are adapted to engage the bracket 40 to limit the reciprocating movement of that arm.

FIG. 4 shows the shock absorbing unit with the door in the closed position. In this position both the crank arm 7 and the cranks 34 are located in substantial alignment with the lower rail 4 and the shear block 38 is in the normal, non-shear position. As shown in FIG. 4, the stop 41 is disposed in engagement with the bracket 39, while the stop 44 is in engagement with the bracket 40.

When the door is moved laterally outward of the opening in the car 1 by rotation of the vertical rods 8, the crank arms 7 pivot to the position shown in FIG. 5, and similarly, the cranks 34, which are also attached to the rods 8, pivot outwardly to move the arms 35 laterally away from the outer surface of the door. Due to the lost motion connection provided by the engagement of pin 36 with the slot 37, the arms 35 do not move longitudinally with respect to each other so that the shear block 38 is still in a non-shear position, as shown in FIG. 5.

FIG. 6 shows the shock absorbing unit when the door 3 strikes the track stop 33. As shown in FIG. 6, the door moves in the direction of the arrow, and the roller unit 6 engages the track stop 33 causing the forward crank arm 7 to be pivoted to a position generally normal to the direction of door movement, thereby moving the forward end of the door laterally outward of the car. This excessive pivotal movement of the crank arm 7 caused by the impact serves to rotate the vertical rod 8 beyond its normal arc of rotation, thereby pivoting the corresponding crank 34 and moving the arm 35b to the right as shown in FIG. 5. As the arm 35a cannot move to the right, due to the engagement of the stop 41 with the bracket 39, the shear block 38 is stretched to thereby dampen or absorb the shock of the roller unit 6 striking the stop 33.

As previously noted, the shock absorbing unit is used in conjunction with the slip clutch. Thus, when the crank arm 7 moves through the angle A from its normal open position to its impacted position, as shown in FIG. 6, this additional pivotal movement will slip the clutch so that the additional rotation of the rod 8 is not transmitted back through the door operating mechanism.

After the impact has been absorbed, the resiliency of the shear block 38 will return the arms 35a and 35b to their original position as shown in FIG. 5.

When the forward roller unit 6 strikes the track stop 33, the rear roller unit 6 may tend to raise from the rail 4, but the engagement of the lip 32 with the recess 31 acts to prevent the rear roller unit from jumping the track when the front roller unit hits the track stop. In addition, the frictional engagement of the lip 32 with the recess 31 as the door tilts on impact, tends to absorb a portion of the energy of impact.

FIGS. 7–10 illustrate a modified form of the invention in which a shock absorber unit is associated with each of the vertical rods 8. As best shown in FIG. 7, the shock absorbing unit includes a rigid sleeve or tube 45 which is spaced outwardly of the rod 8. Located between the outer sleeve 45 and the rod 8 is a layer of resilient material 46 formed of rubber or the like. The layer 46 is bonded to both the sleeve 45 and the rod 8.

A cap 47 is secured to the upper end of the sleeve and is provided with a central opening so that rod 8 is freely rotatable within the cap 47. Cap 47 is provided with an outwardly extending projection 48 which is adapted to engage an abutment 49 located on the door 3.

FIG. 8 shows the shock absorbing unit when the door is in the closed position. As shown in FIG. 8, the crank arms 7 are located in alignment with the lower track or rail 4 and the projections 48 are located approximately 60° from the abutments 49 on the door 3.

When the door is moved laterally outward to the open position, by rotation of the vertical rods 8 through the operating mechanism 13, the crank arms 7 are pivoted to the position shown in FIG. 9, and similarly the caps 47 are pivoted to a position where the projections 48 engage the abutments 49. In this position, as shown in FIG. 9, the door is fully opened and can be moved along the upper and lower rails 4 and 5.

FIG. 10 shows the relationship of the shock absorbing unit when the open door strikes an abutment, such as the track stop 33, with the door moving in the direction of the arrow. Engagement of the roller unit 6 with the track stop 33 will pivot the forward crank arm 7 through the angle B, as shown in FIG. 10, to a position where the crank arm is substantially normal to the rail 4. Pivotal movement of the crank arm 7 through the arc B will move the forward end of the door laterally outward. As the projection 48 is in engagement with abutment 49, the cap 47 will not rotate under the force of impact, and instead, the rubber or resilient layer 46 will twist to provide a damping or shock absorbing effect. After the shock has been absorbed, the resilient nature of the layer 46 will return the mechanism to the relationship shown in FIG. 9 in which the door is in the fully open position.

FIGS. 11–13 illustrate a form of the invention to which a torsion rod is incorporated in the shock absorbing unit. In this embodiment the cranks arms 7 and 10 are secured to vertical rods 49 which are journaled on the outer surface of door 3 by bearings 50.

The rods 49 are connected to an operating mechanism located within cover plate 13 through a slip clutch unit similar to that described with respect to the first embodiment. As shown in FIG. 11, crank arm 22 of the operating mechanism is connected to sleeve 19 which is journaled around rod 49, and sleeve 19 is provided with a pair of recesses 20 having inclined surfaces which engage the inclined surfaces on collar 16 secured to rod 49. The inclined surfaces of sleeve 19 and collar 16 are urged toward each other by a spring which is located within housing 24.

Attached to the rod 49 below collar 16 is a cap 51 having an outwardly extending ear or lug 52 which is adapted to engage a stop 53 mounted on door 3 after a predetermined degree of rotation of rod 49.

The lug 52 and stop 53 are positioned such that, during normal pivotal movement of the rods 49 to move the door between the open and closed positions, the lug 52 will not engage the stop 53, or may barely engage the stop at the end of the pivotal stroke, as shown in FIG. 12.

When the open door strikes an abutment, such as the track stop 33, engagement of the roller unit 6 with the track stop will pivot the forward crank arm 7 through an angle C of overtravel, as shown in FIG. 13, to a position where the crank arm 7 is substantially normal to the rail 4. As the lug 52 is in engagement with stop 53 as the crank arm 7 begins to pivot through the angle C of overtravel, the cap 51 and rod 49 will not rotate, but instead the rod 49 will twist and the twisting action or torsion in the rod 49 provides a damping or shock absorbing effect. After the impact has been absorbed, the resilient nature of rod 49 will return the rod to the relationship shown in FIG. 12.

While the embodiment shown in FIGS. 11–13 illustrates the vertical rods connecting the upper and lower crank arms functioning as a torsion member, it is contemplated that separate torsion members can be used. For example, separate torsion rods can be operably connected to the vertical crank-operating rods so that the torsion rods rotate in accordance with rotation of the vertical rods, or torsion tubes can be located around the vertical rods. Moreover, it is not essential that the vertical operating rods, such as illustrated by 8 and 49, connect the aligned upper and lower crank arms 7 and 10 at the upper and lower edges of the door. Instead, a separate operating rod can be connected to each crank arm, and a slip clutch mechanism and shock absorbing unit can be associated with each operating rod.

The shock absorbing unit of the invention serves to absorb impact in either direction of door movement and will return the door to its normal open position after the impact.

As the shock absorbing mechanism is located on the outside of the door within the profile of the operating mechanism 13, it will not project beyond the wall of the car when the door is in the closed position, and therefore will not add to the overall width of the car.

The shock absorbing unit is preferably used in conjunction with the slip clutch unit so that the impact torque imparted through crank arms 7 to rods 8 will not be transmitted back to the operating mechanism 13.

I claim:
1. In a closure apparatus, a wall having an opening therein, a guide track mounted on the wall, a door mounted for movement on the track and disposed to enclose the opening, said door having a closed position in which the door is located within the opening and having an open position in which the door is disposed laterally outward of said opening, pivotal means connected to the door for supporting the door in pivotal movement between said open and closed position, said pivotal means disposed to rotate through a given arc to move said door between said open and closed positions, operating means mounted on the door for rotating said pivotal means, shock absorbing means including a resilient deformable shock absorbing element operably connected to said pivotal means, and means responsive to said pivotal means rotating beyond said given arc due to impact imparted to the open door for deforming said shock absorbing element to thereby absorb the energy of said impact.

2. The apparatus of claim 1, and including stop means mounted on the wall for limiting movement of the door on said guide track, engagement of the door with said stop means imparting the impact to said door.

3. The aparatus of claim 1, wherein said pivotal means comprises a crank arm and a rotatable member connected to said crank arm, said shock absorbing element being operably connected to said rotatable member.

4. The apparatus of claim 1, and including slip-clutch means operably connected to said pivotal means and arranged to disengage the operating means from said pivotal means when said pivotal means is rotated by impact beyond said given arc.

5. In a closure apparatus, a wall having an opening therein, a guide track mounted on the wall, a door to enclose the opening, said door having a closed position in which the door is located within the opening and having an open position in which the door is disposed laterally outward of said opening, wheel means mounted for movement on said track, a crank arm connected to said wheel means, a rotatable connecting member mounted for rotation with respect to said door and connected to said crank arm whereby rotation of said connecting member between a first position and a second position will pivot said crank arm and move the door laterally in and out of said opening, operating means mounted on the door for rotating said connecting member between said first and second positions, and shock absorbing means including a resilient deformable shock absorbing element operably connected to said connecting member and arranged so that rotational movement of said connecting member beyond said first and second positions will deform said element and absorb the force of said rotational movement.

6. The apparatus of claim 5, and including clutch means interconnecting said connecting member and said operating means, said cluch means arranged to effect a driving connection between said connecting member and said operating means when said connecting member is rotated between said first and second positions and said clutch means arranged to effect disengagement of the driving connection between said connecting member and said operating means on rotational movement of said connecting member beyond said first and second positions.

7. The apparatus of claim 5, wherein a pair of crank arms are located at the upper and lower ends of said door and a connecting member interconnects each crank arm at the upper end of the door with a crank arm at the lower end of the door, said shock absorbing means including a resilient deformable member located on the outside of the door and an arm connected to each connecting member, said arms being secured to spaced portions of said deformable member and arranged to move relative to each other on rotational movement of one of said connecting members beyond said first and second positions to thereby deform the deformable member and absorb said force.

8. The apparatus of claim 7, wherein said arms are connected to said connecting members by a lost motion connection whereby rotation of said connecting member between said first and second positions will not move the arms relative to each other.

9. The apparatus of claim 7, and including stop means to be engaged by each arm to limit movement of that arm when the other arm is moved due to rotational movement of the corresponding connecting member beyond the first and second positions.

10. The apparatus of claim 5, wherein said shock absorbing means comprises a sleeve spaced outwardly of said connecting member, a resilient member disposed between the sleeve and the connecting member and bonded thereto, said sleeve being arranged to rotate with rotation of said connecting member as said connecting member rotates between the first and second positions, and stop means for preventing rotation of said sleeve when said connecting member is rotated beyond said first and second position to thereby cause a deformation of said resilient member to absorb said force.

11. The apparatus of claim 9, wherein said sleeve includes a projection, and said stop means comprises an abutment mounted on the door.

12. The apparatus of claim 1, wherein said shock absorbing element comprises a torsion member operably connected to said pivotal means.

13. The apparatus of claim 12, wherein said torsion member is arranged to rotate freely in accordance with rotation of said pivotal means through said given arc, and said torsion member is arranged so that rotation of said pivotal means beyond said given arc acts to twist said torsion member and absorb the shock of impact.

References Cited

UNITED STATES PATENTS

| 2,658,244 | 11/1953 | Madland | 49—220 |
| 2,747,239 | 5/1956 | Soddy | 49—220 |
| 3,210,067 | 10/1965 | Ferguson et al. | 49—334 X |
| 3,245,125 | 4/1966 | Madland | 49—220 |
| 3,332,168 | 7/1967 | Madland | 49—220 |

JACOB SHAPIRO, Primary Examiner
P. C. KANNAN, Assistant Examiner